US011255320B2

(12) United States Patent
Ikeda et al.

(10) Patent No.: US 11,255,320 B2
(45) Date of Patent: Feb. 22, 2022

(54) COMPRESSOR VALVE ARRANGEMENT

(71) Applicant: Hitachi Industrial Equipment Systems Co., Ltd., Tokyo (JP)

(72) Inventors: Hideaki Ikeda, Tokyo (JP); Hikaru Uchida, Tokyo (JP); Akito Ohata, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 130 days.

(21) Appl. No.: 15/933,489

(22) Filed: Mar. 23, 2018

(65) Prior Publication Data

US 2019/0024652 A1  Jan. 24, 2019

(30) Foreign Application Priority Data

Jul. 19, 2017  (JP) ............................. JP2017-139610

(51) Int. Cl.
| F04B 39/10 | (2006.01) |
| F16K 15/16 | (2006.01) |
| F04B 39/00 | (2006.01) |
| F04B 39/12 | (2006.01) |

(52) U.S. Cl.
CPC ...... *F04B 39/1073* (2013.01); *F04B 39/0016* (2013.01); *F04B 39/1066* (2013.01); *F04B 39/125* (2013.01); *F16K 15/16* (2013.01)

(58) Field of Classification Search
CPC .. F04B 39/1073; F04B 39/00; F04B 27/1009; F04B 39/1013; F04B 39/102; F04B 39/125; F04B 39/1066; F04B 39/0005; F16K 15/16
See application file for complete search history.

(56) References Cited

U.S. PATENT DOCUMENTS

| 919,036 | A | * | 4/1909 | Langer | ................ F04B 39/1073 |
| | | | | | 137/512.1 |
| 2,118,356 | A | * | 5/1938 | Money | ................ F04B 39/1073 |
| | | | | | 137/856 |
| 4,642,037 | A | * | 2/1987 | Fritchman | ........... F04B 39/1073 |
| | | | | | 137/521 |

(Continued)

FOREIGN PATENT DOCUMENTS

| CN | 1135578 A | 11/1996 |
| CN | 2665471 Y | 12/2004 |

(Continued)

OTHER PUBLICATIONS

Partial European Search Report issued in counterpart European Application No. 18179156.7 dated Oct. 15, 2018 (15 pages).

(Continued)

*Primary Examiner* — Nathan C Zollinger
(74) *Attorney, Agent, or Firm* — Crowell & Moring LLP

(57) ABSTRACT

According to the present invention, there is provided a compressor including: a piston reciprocated in a cylinder; a valve seat plate provided with a port through which a fluid passes along with the reciprocation of the piston; a valve provided in the valve seat plate to open/close the port; a valve receiver regulating the degree of opening of the valve; and a stress suppression member provided between the valve and the valve receiver, wherein the stress suppression member includes a valve exposing portion exposing the valve.

8 Claims, 5 Drawing Sheets

(56) References Cited

U.S. PATENT DOCUMENTS

| | | | |
|---|---|---|---|
| 5,647,395 A * | 7/1997 | Hashimoto | F04B 39/1073 |
| | | | 137/514 |
| 5,848,882 A | 12/1998 | Hashimoto et al. | |
| 6,679,688 B2 * | 1/2004 | Sato | F04B 39/1073 |
| | | | 137/856 |
| 6,789,575 B2 * | 9/2004 | Park | F04B 39/1073 |
| | | | 137/527 |
| 10,094,373 B2 * | 10/2018 | Hikichi | F04B 39/1066 |
| 2003/0095883 A1 * | 5/2003 | Hauser | F04B 39/1073 |
| | | | 417/569 |
| 2005/0056329 A1 * | 3/2005 | Lee | F01L 3/205 |
| | | | 137/856 |
| 2005/0079081 A1 | 4/2005 | Nieter | |
| 2013/0014841 A1 | 1/2013 | Moroi et al. | |

FOREIGN PATENT DOCUMENTS

| | | |
|---|---|---|
| CN | 2698984 Y | 5/2005 |
| CN | 102400896 A | 4/2012 |
| CN | 102822525 A | 12/2012 |
| CN | 104100491 A | 10/2014 |
| EP | 0 704 622 A2 | 4/1996 |
| EP | 0 717 191 A2 | 6/1996 |
| EP | 1 680 576 B1 | 1/2010 |
| JP | 11-210624 A | 8/1999 |
| JP | 2005-90495 A | 4/2005 |
| JP | 2009-41481 A | 2/2009 |
| JP | 2010-236564 A | 10/2010 |
| JP | 2017-106397 A | 6/2017 |

OTHER PUBLICATIONS

Chinese-language Office Action issued in counterpart Chinese Application No. 201810245741.4 dated May 27, 2019 with English Translation (17 pages).

Extended European Search Report issued in counterpart European Application No. 18179156.7 dated Dec. 5, 2018 (14 pages).

Chinese-language Office Action issued in Chinese Application No. 201810245741.4 dated Jun. 19, 2020 with English translation (12 pages).

Japanese-language Office Action issued in Japanese Application No. 2017-139610 dated Sep. 22, 2021 with English translation (four (4) pages).

* cited by examiner

COMPRESSOR VALVE ARRANGEMENT

INCORPORATION BY REFERENCE

The present application claims priority to Japanese Patent Application No. 2017-139610, filed on Jul. 19, 2017, the entire disclosure of which is hereby incorporated by reference herein.

BACKGROUND OF THE INVENTION

Field of the Invention

The present invention relates to a compressor.

Description of the Background Art

As a background art of the present invention, JP-A-11-210624 exists. JP-A-11-210624 describes a discharge valve device of a compressor "including a static member including a discharge hole from which compressed gas is discharged and provided in a compression element, a discharge valve secured to the static member, including a valve portion opening/closing the discharge hole, and made of an elastic plate, a valve receiving plate serving as an abutting portion of the discharge valve when the discharge valve is opened, and a valve pressing plate provided between the discharge valve and the valve receiving plate, having a higher elastic force than that of the discharge valve, made of an elastic plate having a curve protruded to the discharge valve side, laminated so as for a tip end thereof to be away from the valve receiving plate and the discharge valve, and secured to the static member together with the valve receiving plate and the discharge valve."

SUMMARY OF THE INVENTION

Since the discharge valve device in JP-A-11-210624 includes the elastic plate having a higher elastic force than that of the discharge valve, the discharge valve is difficult to open, and improvement in compression performance cannot be achieved.

In consideration of the above problem, a structure in which a stress suppression member (packing) having an equal shape to that of the valve plate is interposed between the valve plate and the cylinder head (valve receiver) is employed. The packing in this structure can reduce an impact sound generated when the valve plate made of a metal (such as an SUS material) is hit against the valve receiver when the valve plate is opened/closed at the time of operation of the compressor.

However, the above-described structure has a problem in which initial compression performance, regulation or so with the attached packing is tends to be satisfied, so that a failure to attach the valve plate, i.e., lack of the valve plate, cannot be undesirably detected.

An object of the present invention is to provide a compressor enabling an attachment fault of the valve plate (failure to attach the valve plate) to be detected in a product performance inspection.

In a case of a product of such a conventional product that does not employ the above structure (packing), in a state in which a user fails to attach the valve plate, compressed air is not accumulated in a tank, or tank pressure is not increased.

However, in a case in which the above structure (packing) is employed, the packing in a new state at the time of production shipping functions as an alternative to the valve plate. Thus, the product may pass a product performance inspection. Also, since the valve plate and the packing are in equal shapes, the valve plate is hidden by the packing when the valve seat is seen from the upper side in a state in which the valve plate and the packing are attached, and the failure to attach the valve plate cannot be detected even in visual check.

The present invention proposes a way for solving the above problem, and an example thereof is as follows.

A compressor includes a piston reciprocated in a cylinder, a valve seat provided with a port through which a fluid passes along with the reciprocation of the piston, a valve plate provided in the valve seat to open/close the port, a valve receiver regulating the degree of opening of the valve plate, and a stress suppression member provided between the valve plate and the valve receiver. The stress suppression member is provided with a valve exposing portion exposing the valve plate. This valve exposing portion may be a hole or a cut-out.

According to the present invention, in the compressor provided with the stress suppression member between the valve and the valve receiver, the failure to attach the valve plate can be prevented or detected. Other objects, features, and advantages of the present invention will be apparent from description of the following embodiments of the present invention with reference to the attached drawings.

DESCRIPTION OF THE EMBODIMENTS

First Embodiment

Figure 1:
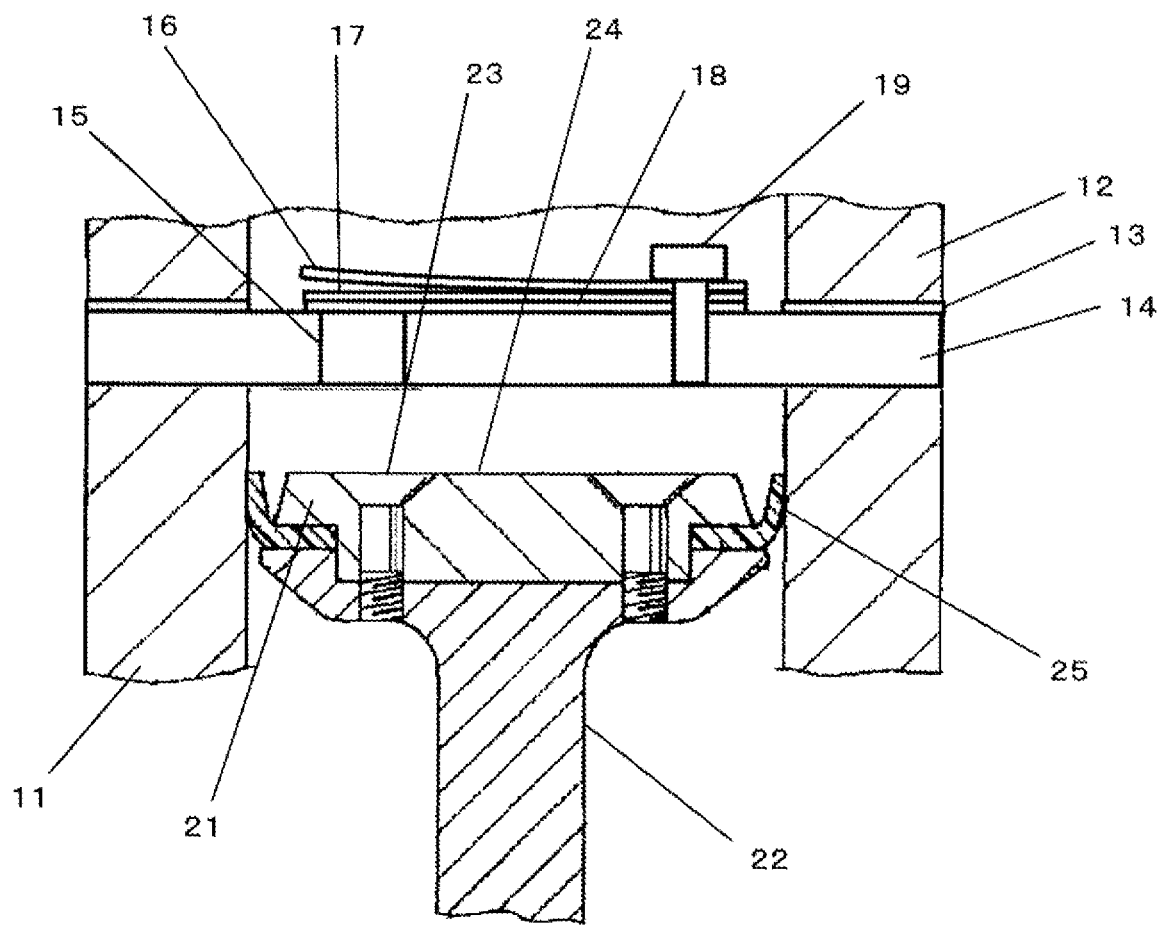
FIG. 1 is a cross-sectional view of a compression portion of a compressor according to a first embodiment of the present invention.

Hereinafter, a first embodiment of a compressor according to the present invention will be described with reference to FIGS. 1 and 2.

A compressor according to the present embodiment will be described with reference to FIG. 2.

In the compressor according to the present embodiment, a piston 21 is reciprocated in a space formed by a crank case 1 and a cylinder 11 to compress a fluid such as air.

The piston 21 is driven by rotation of a driving shaft 2. The driving shaft 2 is driven to be rotated by a motor, not shown, housed in the crank case 1. The rotating motion of the driving shaft 2 is converted into eccentric motion of a base end portion of a connecting rod 22 connected to the piston 21 by an eccentric member 3. A bearing 4 supports the driving shaft 2 together with the eccentric member 3. Due to the eccentric motion of the base end portion of the connecting rod 22, the piston 21 is reciprocated while swinging. The bearing 4 is provided with a spindle 5 to keep balance of the eccentric motion.

It is to be noted that, in the present embodiment, although a case in which the piston 21 is secured to the tip end portion of the connecting rod 22, and in which the piston 21 is reciprocated while swinging is described as an example, a piston pin may be used, the piston 21 may be rotatably connected to the connecting rod 22, and the piston 21 itself may not swing.

It is to be noted that, in the present embodiment, although the driving shaft 2 itself does not move eccentrically, but the motion of the driving shaft 2 is converted into the eccentric motion by the eccentric member 3, the piston 21 can also be reciprocated by using an eccentric crank shaft as the driving shaft 2.

Figure 2:
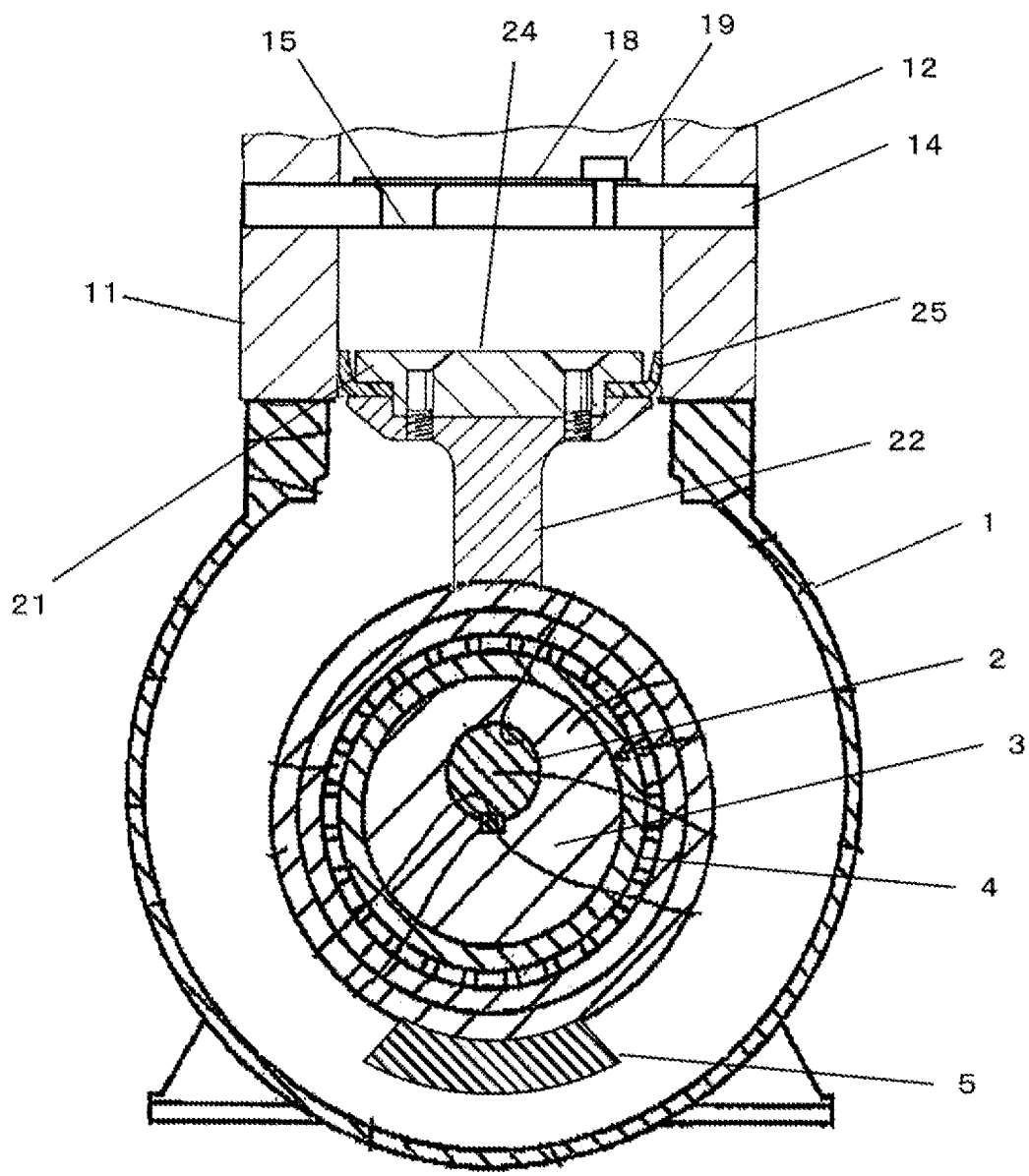
FIG. 2 is a cross-sectional view of the compressor according to the first embodiment of the present invention.

FIG. 1 illustrates a detailed structure of a compression portion including the piston 21, the cylinder 11, and a valve seat plate 14.

The piston 21 provided to enable reciprocation in the cylinder 11 includes the connecting rod 22 and a circular-plate-like retainer 24 fastened to the connecting rod 22 by bolts 23.

A lip ring 25 provided on the outer circumferential side of the swing piston 21 is made of a resin material and is formed in a ring shape. The lip ring 25 receives pressure in the space of the cylinder 11 and is scaled in diameter to seal the gap between the piston 21 and the cylinder 11.

The lip ring 25 is also interposed between the connecting rod 22 and the retainer 24 and is secured in a state of being fastened by the bolts 23.

The lip ring 25 is further in sliding contact with the inner circumferential surface of the cylinder 11 with a tightening margin.

The end portion of the cylinder 11 is provided with a cylinder head 12, and the piston 21 is reciprocated in a space of a compression chamber formed by the cylinder 11 and the cylinder head 12 to cause a fluid to be sucked into the compression chamber, compressed, and then discharged to a tank or the like connected to an outside.

The valve seat plate 14 secured between the cylinder 11 and the cylinder head 12 is provided with a discharge port 15. The valve seat plate 14 is also provided with a valve, i.e., a discharge valve, 18, opening/closing the discharge port in accordance with the pressure difference, secured by a bolt 19.

The valve 18 is closed when the compressor is in a sucking process, and the piston 21 moves from a top dead point to a bottom dead point (from the side of the cylinder head 12 to the side of the crank case 1) to prevent a compressed fluid from flowing backward from the tank.

On the other hand, the valve 18 is opened when the compressor is in a compression process, and the piston 21 moves from the bottom dead point to the top dead point (from the side of the crank case 1 to the side of the cylinder head 12) to cause compressed air in the cylinder to be discharged through the discharge port 15 to the outside tank or the like.

On the upper side of the valve 18 (in a direction in which the valve 18 is opened), a stress suppression member 17 (for example, a heat-resistant resin) is provided. On the upper side of the stress suppression member 17, a valve receiver 16 regulating the degree of opening of the valve 18 is provided. The stress suppression member 17 needs to be made of a heat-resistant material, and an example thereof is a resin material such as a PTFE.

As illustrated in FIG. 1, the stress suppression member 17 is provided not only around the securing end of the valve 18 but also at the tip end of the valve 18 and is arranged to be interposed between the valve 18 and the valve receiver 16. That is, the stress suppression member 17 is interposed between the valve 18 and the valve receiver 16 at the tip end (opening end) of the valve 18 as well. This can prevent the valve 18 from contacting the tip end of the valve receiver 16 and can restrict generation of a contact sound (noise).

According to the present embodiment, stress generated in the valve 18 can be reduced, the duration of the valve 18 can be extended, and the contact sound (noise) between the valve 18 and the valve receiver 16 can be reduced.

Also, in the present embodiment, the elastic force of the stress suppression member 17 is lower than that of the valve 18. Accordingly, due to the stress suppression member 17, the degree of opening of the valve 18 is not regulated more than necessary, and a decrease in compression efficiency can be restricted.

Since the degree of opening of the valve 18 is regulated by the valve receiver 16, forming the stress suppression member 17 to have a low elastic force does not lead to delay in closing caused by excessive opening of the valve 18 and an increase of the contact sound.

Figure 6:
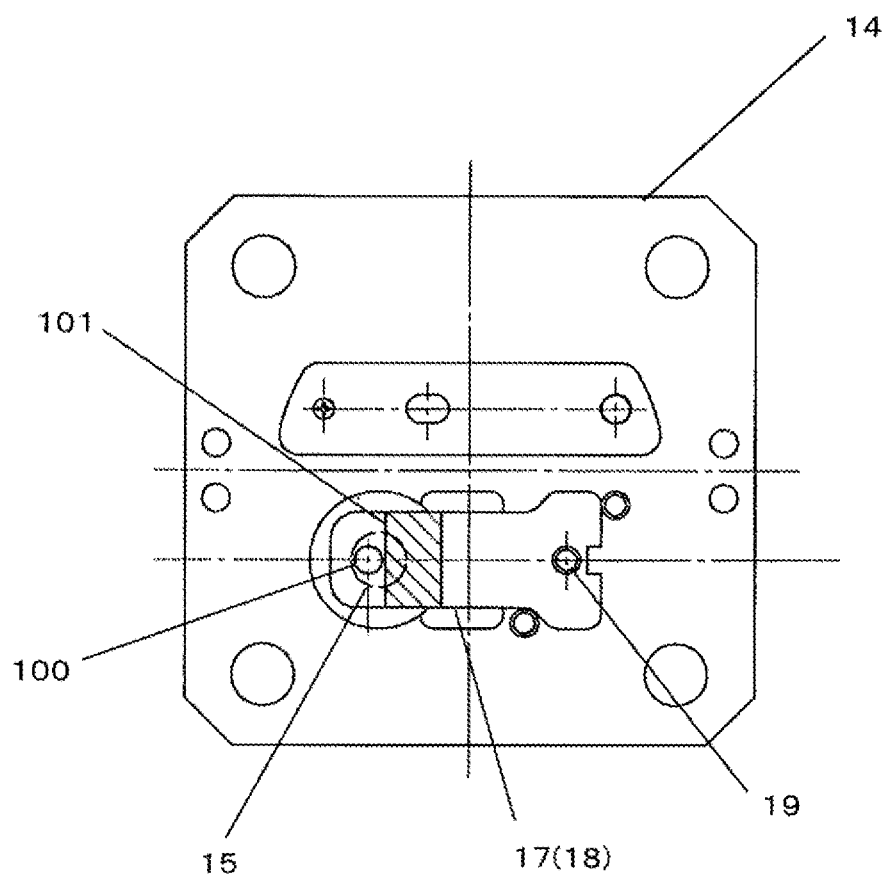
FIG. 6 is an upper view of the compression portion from which a cylinder head 12 is detached.

FIG. 6 illustrates an upper view of the compression portion from which the cylinder head 12 is detached. The discharge port 15 is arranged on the right side of the valve seat plate 14, and the valve 18 and the stress suppression member 17 are arranged and secured on the discharge port 15 in order.

The stress suppression member 17 according to the present embodiment is in an equal shape to that of the valve 18 and has a valve exposing portion 100 partially exposing the valve 18. The valve exposing portion 100 is a through hole provided in the stress suppression member 17, and the valve 18 is exposed from the through hole. Another configuration instead of the through hole may be available as long as the configuration exposes the valve 18. For example, the outer circumference of the stress suppression member 17 may be provided with a cut-out so that the valve 18 may be exposed from the stress suppression member 17.

In this manner, by checking the valve 18 exposed from the valve exposing portion 100 of the stress suppression member 17 visually or by means of a camera or the like, a failure to attach the valve 18 can be prevented.

In the present embodiment, the valve exposing portion 100 is arranged at a position at least partially overlapping with the discharge port 15. This is a configuration in which, in a case in which the failure to attach the valve 18 occurs, the through hole communicates with the compression chamber. Accordingly, in a case in which the failure to attach the valve 18 occurs, and in which the failure is not detected, compressed air will leak to the compression chamber in a product performance inspection in this configuration. Thus, the failure can be detected at the time of the product performance inspection.

For example, to facilitate the detection at the time of the product performance inspection, the size of the valve exposing portion 100 is set to 4 mm in diameter, and the color of the stress suppression member 17 is set to white, which has a higher contrast ratio with respect to those of the other members.

It is to be noted that the stress suppression member 17 may have a larger external shape than that of the valve 18 as long as the stress suppression member 17 is partially provided with the cut-out or the through hole and exposed.

On the other hand, the stress suppression member 17 may have a smaller external shape than that of the valve 18 as long as the stress suppression member 17 is inserted between the valve 18 and the valve receiver 16 to enable the noise prevention so that the valve 18 may be exposed from the stress suppression member 17.

Also, the shaded area of FIG. 6 depicted an abrasion-and-crush portion 101 of the stress suppression member 17 repetitively pressed by the valve 18 and the valve receiver 16. In the present embodiment, to decrease a risk of breakage of the stress suppression member 17, the valve exposing portion 100 is arranged out of the range of the abrasion-and-crush portion 101 to avoid abrasion and crush. This improves durability.

While the discharge valve has been described above in the present embodiment, a sucking valve shall have a similar configuration. Accordingly, in the sucking valve as well, the contact sound (noise) between the valve and the valve receiver can be reduced while restricting lowering of the compression performance.

Second Embodiment

A compressor according to a second embodiment of the present invention will be described with reference to FIG. 3. Similar components to those in the first embodiment are shown with the same reference numerals, and description of the duplicate components is omitted.

Figure 3:
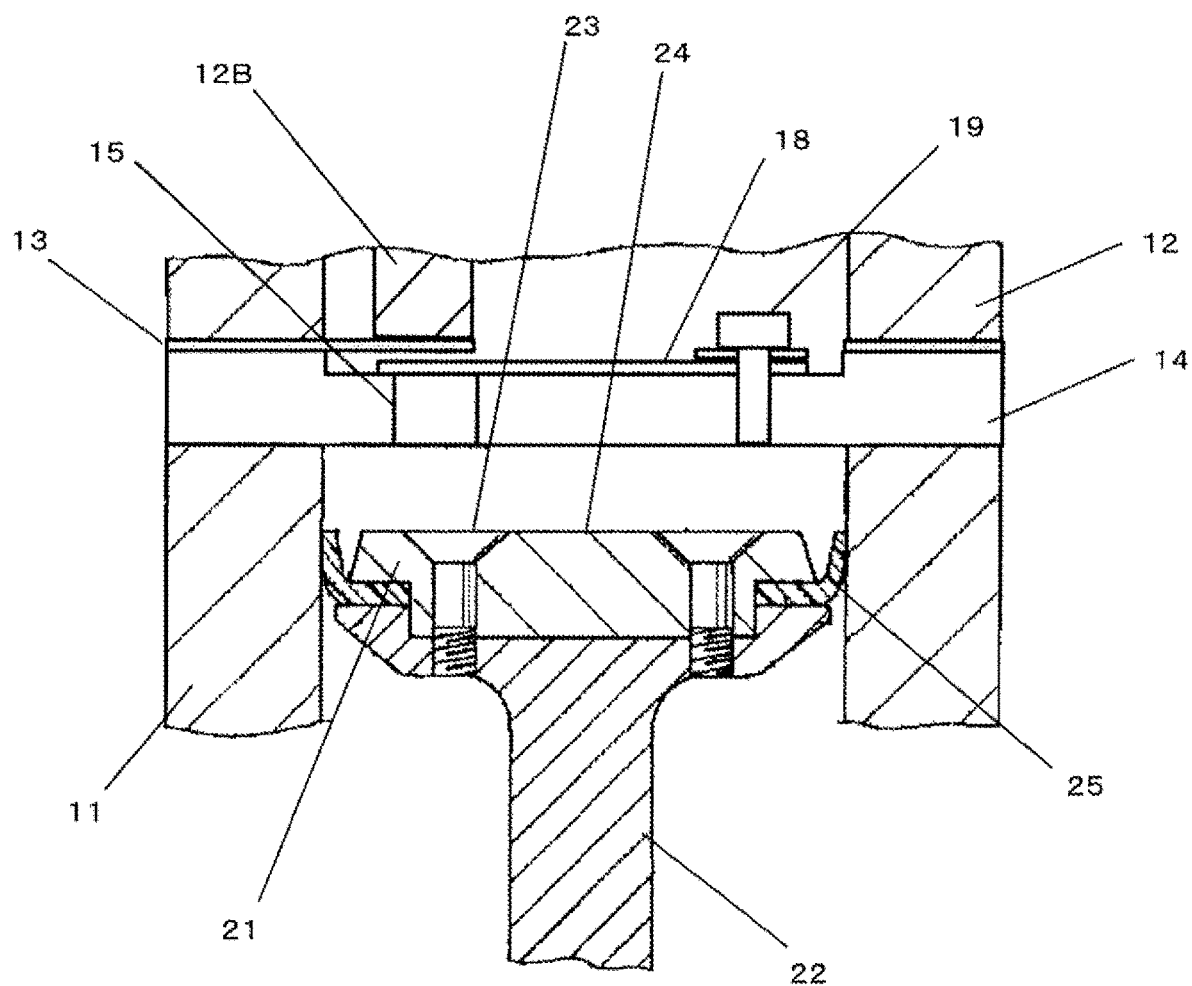
FIG. 3 is a cross-sectional view of a compression portion of a compressor according to a second embodiment of the present invention.

FIG. 3 illustrates a detailed structure of a compression portion including the piston 21, the cylinder 11, and the valve seat plate 14.

The valve seat plate 14 is secured between the cylinder 11 and the cylinder head 12. A packing 13 is provided between the cylinder head 12 and the valve seat plate 14 to prevent compressed air from leaking to an outside. The valve seat plate 14 is also provided with the valve 18, opening/closing the discharge port in accordance with the pressure difference, secured by the bolt 19.

The cylinder head 12 on the upper side of the valve 18 is provided with a valve receiver 12B regulating the degree of opening of the valve 18. That is, a part of the cylinder head 12 located on the upper side of the opening end of the valve 18 is formed to be protruded toward the valve 18.

As illustrated in FIG. 3, the packing 13 extends to the tip end of the valve 18 and is arranged to be interposed between the valve 18 and the valve receiver 12B.

Thus, according to the present embodiment, the contact sound (noise) between the valve 18 and the valve receiver 12B can be reduced.

In the present embodiment as well as in the first embodiment, the elastic force of the packing 13 is lower than that of the valve 18. Accordingly, the degree of opening of the valve 18 is not regulated more than necessary, and a decrease in compression efficiency can be restricted.

According to the present embodiment, in a case in which the valve receiver 12B is provided only on the upper side of the opening end of the valve 18 (on the side on which the valve 18 is opened), the packing 13 is used as the stress suppression member to enable the number of parts to be reduced and enable the weight to be reduced.

Third Embodiment

A compressor according to a third embodiment of the present invention will be described with reference to FIG. 4. Similar components to those in the first embodiment are shown with the same reference numerals, and description of the duplicate components is omitted.

Figure 5:
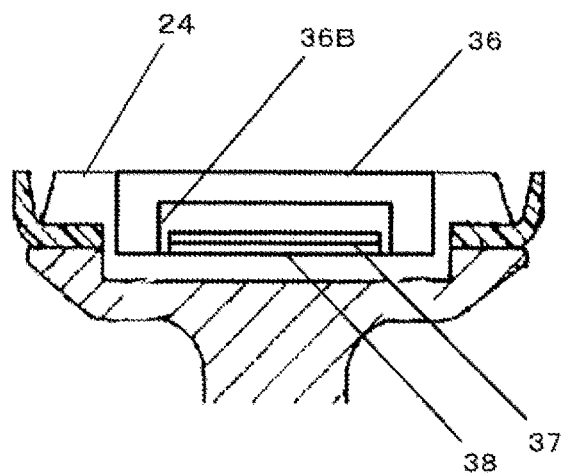
FIG. 5 is a cross-sectional view of a piston as seen in the direction A in FIG. 4.

FIG. 5 illustrates a detailed structure of a compression portion including the piston 21, the cylinder 11, and the valve seat plate 14.

In the present embodiment, the retainer 24 is provided with a groove, and the groove formed in the retainer 24 is provided with a sucking valve 38 and a stress suppression member 37. In the retainer 24 and the connecting rod 22, a communication port 35 communicating into the crank case 1 is formed.

The sucking valve 38 is opened when the compressor is in the sucking process, and the piston 21 moves from the top dead point to the bottom dead point (from the side of the cylinder head 12 to the side of the crank case 1) to cause air in the crank case 1 to be sucked in the compression chamber formed between the cylinder head 12 and the piston 21.

On the other hand, the sucking valve 38 is closed when the compressor is in the compression process, and the piston 21 moves from the bottom dead point to the top dead point (from the side of the crank case 1 to the side of the cylinder head 12) to prevent a compressed fluid from flowing backward from the compression chamber to the crank case 1.

A valve receiver 36 is secured to the retainer 24 and the connecting rod 22 by the bolt 23. The stress suppression member 37 is provided between a valve receiver 36 and the valve 38.

The elastic force of the stress suppression member 37 is lower than that of the valve 38. Accordingly, due to the stress suppression member 37, the degree of opening of the valve 38 is not regulated more than necessary, and a decrease in compression efficiency can be restricted.

Figure 4:
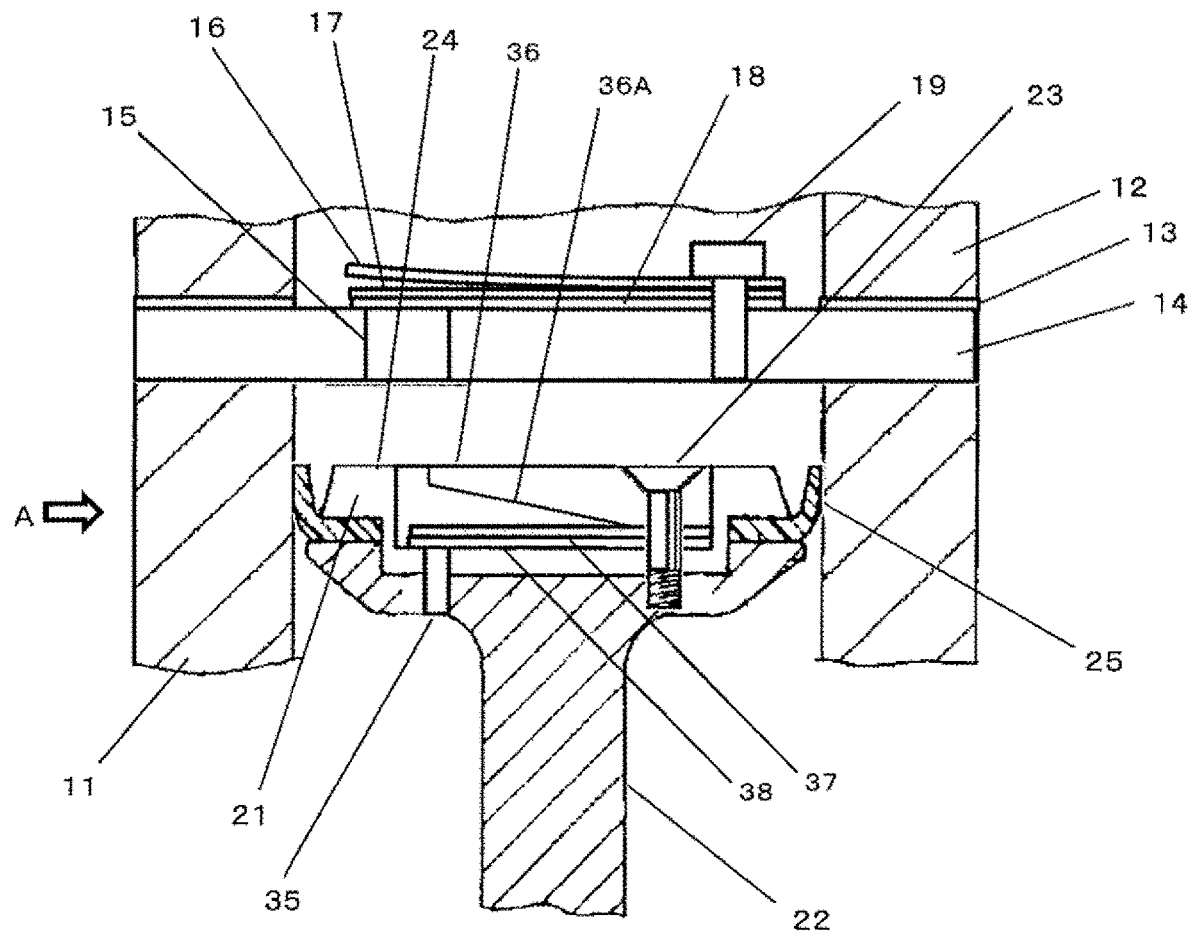
FIG. 4 is a cross-sectional view of a compression portion of a compressor according to a third embodiment of the present invention.

FIG. 5 is a cross-sectional view of the piston 21 as seen in a direction "A" in FIG. 4.

A wall 36B is provided at the right and the left of the valve receiver 36 as seen from the opening end side of the valve 38 in FIG. 4 (in the direction A). In a case in which the stress suppression member 37 is provided to the piston 21, the stress suppression member may be displaced in the right-left direction by the swing motion of the piston. In a case in which the stress suppression member is displaced in the right and left direction, the valve may contact the valve receiver 36, which may cause generation of a noise.

According to the present embodiment, by providing the wall 36B, the displacement of the stress suppression member can be restricted, and generation of the noise can be avoided.

The foregoing embodiments described above are illustrative only to carry out the present invention, and the technical range of the present invention is not interpreted in a limited manner by these embodiments. That is, the present invention can be carried out in various ways without departing from the technical idea or the main characteristics of the present invention. Also, the present invention may be carried out by combining a plurality of embodiments.

The invention claimed is:
1. A compressor comprising:
a piston reciprocated in a cylinder;
a valve seat plate provided with a port through which a fluid passes along with the reciprocation of the piston;
a valve provided in the valve seat plate to open/close the port;
a valve receiver regulating the degree of opening of the valve; and
a stress suppression member provided between the valve and the valve receiver, the stress suppression member having an external shape equal to or larger than an external shape of the valve and covering an entirety of the valve,
wherein the stress suppression member includes a valve exposing portion exposing the valve, and
wherein a color of the stress suppression member has a higher contrast ratio than a color of the valve.

2. The compressor according to claim 1, wherein the stress suppression member is arranged between the valve and the valve receiver at an opening end of the valve.

3. The compressor according to claim 1, wherein the valve exposing portion is arranged out of a range of an abrasion-and-crush portion of the stress suppression member.

4. The compressor according to claim 1, wherein the valve exposing portion is a through hole or a cut-out.

5. The compressor according to claim 1, wherein the valve exposing portion at least partially overlaps with the port.

6. A compressor comprising:
a piston reciprocated in a cylinder;
a cylinder head provided at an end portion of the cylinder;
a motor connected to the piston to drive the piston; and
a crank case connected to the cylinder and housing the motor,
wherein the piston includes a connecting rod connected to a driving shaft of the motor and a retainer provided at a tip end of the connecting rod,
wherein a compression chamber is formed between the piston and the cylinder head,
wherein the retainer and the connecting rod are provided with a communication port causing the compression chamber to communicate with the crank case,
wherein the retainer is provided with a groove, and the groove in the retainer is provided with a sucking valve opening/closing the communication port and a valve receiver regulating a degree of opening of the sucking valve,
wherein a stress suppression member having a lower elastic force than the sucking valve is provided between the sucking valve and the valve receiver,
wherein the stress suppression member includes a valve exposing portion exposing the sucking valve, and has an external shape equal to or larger than an external shape of the valve, and
wherein a color of the stress suppression member has a higher contrast ratio with respect to a color of the valve.

7. The compressor according to claim 6, wherein the stress suppression member is arranged between the sucking valve and the valve receiver at an opening end of the sucking valve.

8. The compressor according to claim 6, wherein the valve receiver includes a wall restricting displacement of the sucking valve in a right-left direction at a right and a left of the sucking valve as seen from the opening end side of the sucking valve.

* * * * *